United States Patent [19]

Teppo et al.

[11] 4,024,392
[45] May 17, 1977

[54] GIMBALLED ACTIVE OPTICAL SYSTEM

[75] Inventors: Edward A. Teppo; Leonard R. Haugen, both of Ridgecrest, Calif.

[73] Assignee: The United States of America as represented by the Secretary of the Navy, Washington, D.C.

[22] Filed: Mar. 8, 1976

[21] Appl. No.: 664,786

[52] U.S. Cl. .............................. 250/216; 250/234; 350/301
[51] Int. Cl.² ......................................... H01J 3/14
[58] Field of Search .......... 250/201, 202, 203, 216, 250/234, 235, 236, 341; 244/3.13, 3.16; 356/4, 5, 141, 152; 350/301, 302

[56] References Cited

UNITED STATES PATENTS

| 3,326,619 | 6/1967 | Johnson et al. | 250/203 R |
| 3,669,540 | 6/1972 | Rattman et al. | 356/5 |
| 3,677,646 | 7/1972 | Granqvist | 356/4 |
| 3,761,163 | 9/1973 | Chapman | 350/301 |
| 3,899,145 | 8/1975 | Stephenson | 244/3.16 |

Primary Examiner—David C. Nelms
Attorney, Agent, or Firm—R. S. Sciascia; Roy Miller; W. Thom Skeer

[57] ABSTRACT

A gimballed active optical system for pointing and tracking having a laser beam output which coincides with the gimbal system instantaneous field-of-view over wide angles to produce an active laser seeker.

11 Claims, 2 Drawing Figures

GIMBALLED ACTIVE OPTICAL SYSTEM

BACKGROUND OF THE INVENTION

The present invention relates to a gimballed optical system, and more particularly to a gimballed optical system combining a laser transmitter and receiver into a single system.

Lasers applied to pointing and tracking systems can provide some very desirable features, such as high spatial resolution, accurate centroid tracking, target discrimination, coding, etc. Semi-active trackers have been used, but all require a separately controlled and operated laser.

SUMMARY OF THE INVENTION

Accordingly, the present invention provides an active laser seeker with a self-contained laser so that target radiation is not required. A laser contained in the seeker provides a source of optical energy in the form of a beam which is deflected by optical elements through the hollow shafts of a gimballed system. The laser beam output is directed to be coincident with the center of the field-of-view of the gimballed system.

DESCRIPTION OF THE PREFERRED EMBODIMENT

Figure 1:
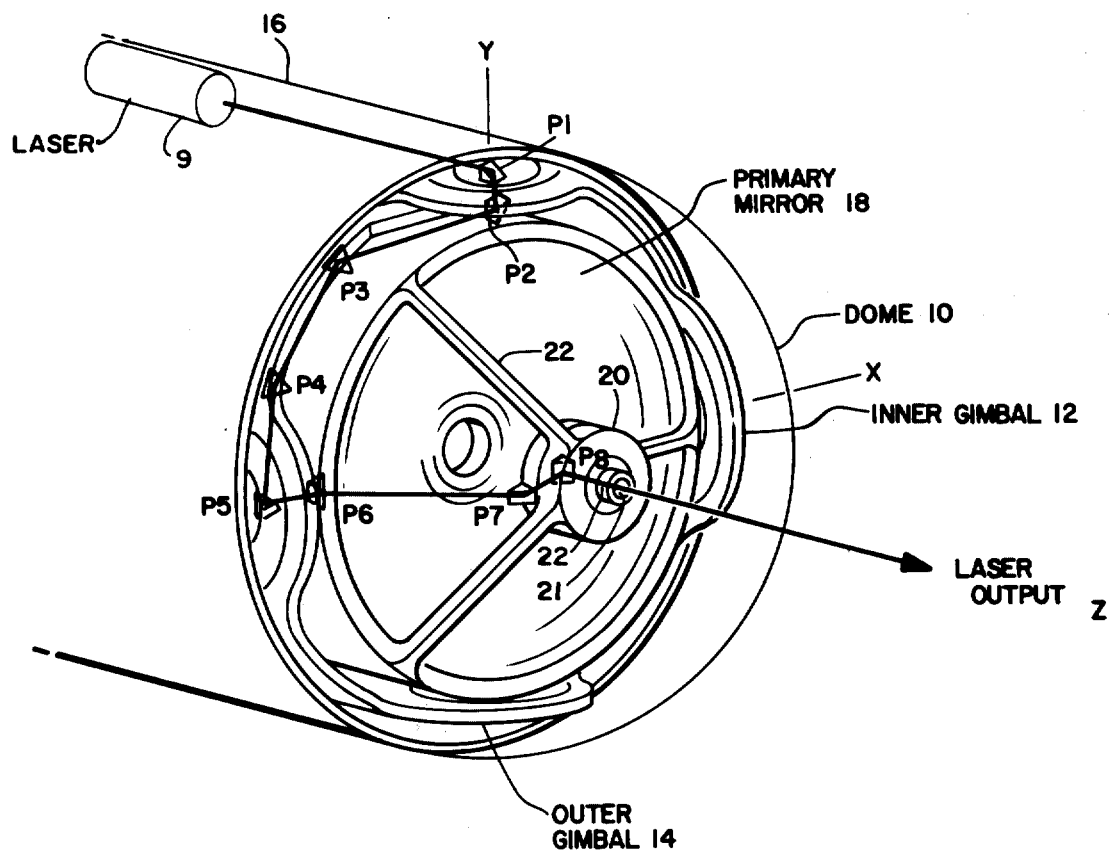
FIG. 1 is a perspective view of the present invention illustrating the transmission path.

Referring now to the drawing, FIG. 1 shows a two-axis gimballed optical system having a transparent dome 10, an inner gimbal 12 and an outer gimbal 14. The system is mounted on a stable platform 16. A primary objective mirror 18, such as a concave mirror, is either mounted fixedly to the stable platform, or is mounted on the inner gimbal 12 as illustrated, to act as an optical receiving mirror. A plurality of optical elements, such as prisms P1 through P8, are mounted on the system so that optical energy in the form of an optical beam from an optical emitter, such as a laser 9, is directed along the axis of the outer gimbal 14, then along the interior of the outer gimbal to the axis of the inner gimbal 12, along the axis of the inner gimbal, then to the optical axis of the system, and finally along the optical axis of the system as an output beam. An X, Y, Z-coordinate system is superimposed in FIG. 1 for ease of illustration.

The laser input beam is folded by prism P1, mounted on the stable platform 16, along the y-axis to prism P2, mounted on the inner surface of the outer gimbal 14. Prism P2 remains in optical alignment with P1 regardless of the angle through which the outer gimbal 14 is rotated. The beam is folded by P2 along the inner-surface of the outer gimbal 14 to prisms P3, P4 and P5 with P5 located on the x-axis. Prisms P3 through P5 also are mounted on the inner surface of the outer gimbal 14. Prism P5 folds the beam along the x-axis to prism P6, mounted on the inner surface of the inner gimbal 12. As with P2, prism P6 remains in optical alignment with P5 regardless of the angle through which the inner gimbal rotates. The beam is folded by prism P6 to prism P7 and P8, with P8 located on the z-axis. Prism P8 then folds the beam so that it is directed along the z-axis which is the optical axis of the system. A central housing 20 is mounted on the inner gimbal 12 by support posts 22, and the housing contains prism P8 as well as the receiver optics.

Figure 2:
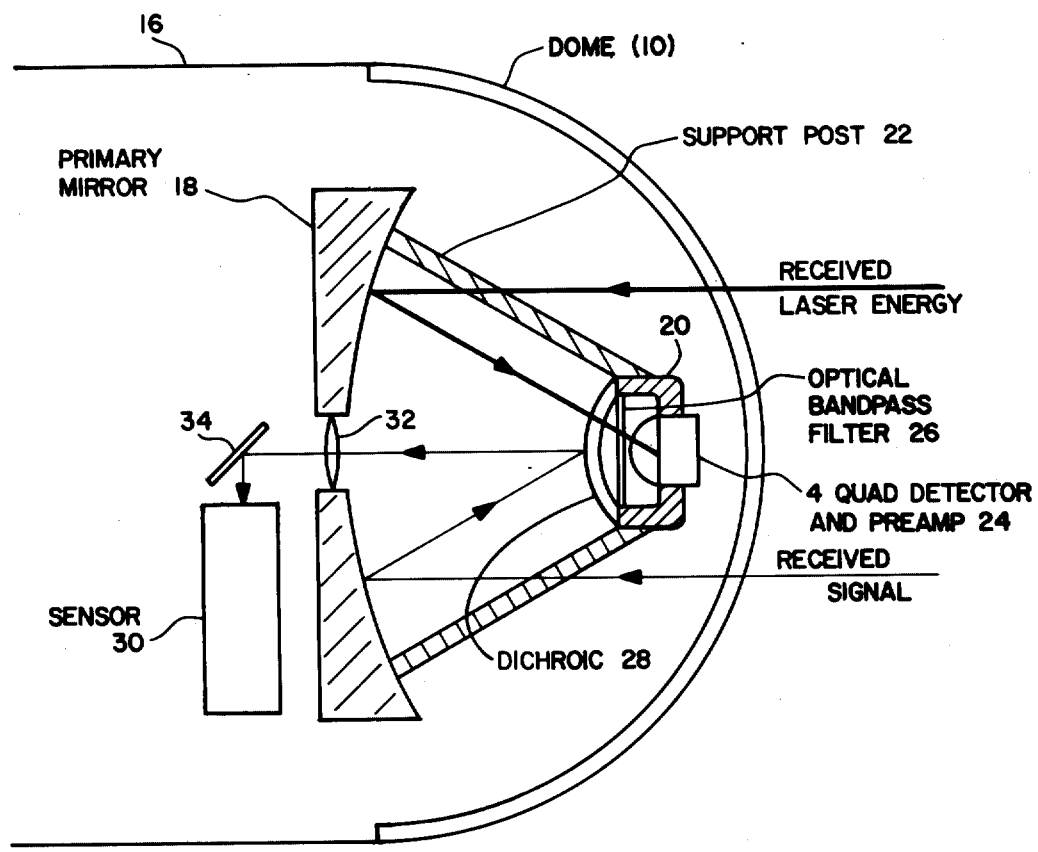
FIG. 2 is a cross-sectional view of the present invention illustrating the reception path.

FIG. 2 shows the receiver optics for the system with an optional viewing system included. An optical quadrature detector 24, such as a photodiode with its associated preamplifier, is mounted on the rear of the housing 20 at the focal plane of the primary mirror 18 so that the detector faces the mirror. An optical bandpass filter 26 is also mounted on the housing 20 between the mirror 18 and the detector 24 adjacent to the detector to pass radiation only near and centered at the frequency of the transmitting laser. If the optional viewing system is desired, a lens with a dichoric surface coating 28 is mounted on the rear of the housing 20 so that the received laser energy passes through the dichroic to the quadrature detector 24, but other frequencies are reflected to the viewing sensor 30 via a lens 32 and mirror 34 assembly, the lens being located in a central hole through the primary mirror 18. The viewing sensor 30 could be a TV tube, a charge coupled device (CCD), a charge injection device (CID), a monolithic focal plane array (MFPA), or the like.

The prisms used are total internal reflecting prisms, and are preferred over mirrors or fiber-optic bundles since they are easier to mount, minimize polarization effects, permit optical alignment with a visible CW laser and have high coupling coefficients with no erection torques. The input prism P1 and the output prism P8 may be provided with adjustable mounts to permit alignment capability. Also, some degree of output beam divergenece control is possible by adding a small lens element on each side of the output prism P8, or anywhere else it is convenient for this collimator lens pair, such as external to the output prism shown at 21 but inside the dome 10. Finally, the laser path from the laser input to the output prism P8 may be optically shielded, as by lens mount 22, for example, to prevent stray laser radiation.

In operation a laser provides an optical beam which is deflected by the prisms P1 through P8 through the hollow shafts of the gimbals 12 and 14 to the system optical axis, and then along the optical axis through the dome 10. A small portion of the beam is then reflected by a target and returns to the system, passing through the dome 10 to reflect from the primary mirror 18 onto the optical quadnature detector 24, where it is converted into electrical energy for processing by the system electronics to provide, for example, position and range information. A portion of the received energy may be reflected from the dichroic-lens assembly 28 via a lens 32 and mirror 34 assembly to a viewing sensor 30 to provide the operator with a viewing system. The instantaneous field-of-view is determined by the detector 24, and for a photodiode it is typically 4° depending upon the photodiode diameter. Gimbal movement is typically ±55° around both axes, depending upon the gimbal limits.

Thus, the system can scan for a target, and then lock onto and follow the target once found. The operator, by means of the viewing system, can make a determination whether to stay with the target located, or whether to search for another target. Very small boresight errors are maintained with this system, resulting in improved performance. Since only a single optical system is used, there also are resultant reductions in space, cost and complexity.

The present invention may be applied to any gimbal system, free gyro stabilized or rate-aided stabilized, with only the geometry and optical/mechanical hardware differing. Besides application to missile guidance, the system may be used for stabilized airborne laser illumination, ground based or airborne laser radar, and the like. Obviously many other modifications and variations of the present invention are possible in light of the above teachings. It is therefore to be understood that, within the scope of the appended claims, the invention may be practiced otherwise than as specifically described.

What is claimed is:

1. A gimballed active optical system for use on a stable platform including a primary objective having an optical axis and a detector located in the focal plane thereof the improvement comprising:
   an outer gimbal effectively rotatably mounted on said stable platform by a hollow shaft and having an axis of rotation thereabout;
   an inner gimbal rotably mounted within said outer gimbal on a hollow shaft having an axis positioned orthogonally with respect to the axis of said outer gimbal;
   an illumination source for producing a beam of optical energy having a predetermined frequency; and
   an optical relay system mounted with respect to said illumination source and on said outer and inner gimbals for directing the beam of optical energy around the said outer and inner gimbals through the hollow shafts thereof to energy on an optical axis of the gimballed active optical system, whereby a target may be illuminated thereby in such a manner to reflect energy to said primary objective.

2. A gimballed active optical system as recited in claim 1 wherein said plurality of optical elements comprises:
   an input prism mounted on said stable platform to deflect said beam along the axis of said outer gimbal;
   a plurality of intermediate prisms mounted on the inner surface of said outer and inner gimbals to deflect said beam around said outer gimbal to the axis of said inner gimbal, along the axis of said inner gimbal to the interior of said inner gimbal, and along the interior of said inner gimbal to the optical axis of said active optical system; and
   an output prism mounted on said inner gimbal on the axis of said active optical system to deflect said beam along said optical axis.

3. A gimballed active optical system as recited in claim 2 wherein said input and output prisms are adjustably mounted so that said active optical system can be aligned.

4. A gimballed active optical system as recited in claim 3 further comprising:
   a viewing sensor mounted on said stable platform; and
   means for reflecting energy received by said active optical system to said viewing sensor so that a display is provided of said target located along the optical axis of said active optical system, said reflected energy being at frequencies other than the frequency of said illumination source.

5. A gimballed active optical system as recited in claim 4 wherein said primary objective is a mirror; and said reflecting means comprises:
   a lens with a dichroic coating mounted on said inner gimbal adjacent to said optical detector and between said detector said primary mirror, whereby said optical energy which is reflected from said target passes through said lens to said detector, energy of frequencies other than that of said optical energy is reflected from said lens through a central hole in said primary mirror; and
   a secondary mirror mounted behind said hole in said primary mirror so that said energy reflected from said dichroic-coated lens is reflected to said viewing sensor.

6. A gimballed active optical system as recited in claim 5 further comprising a transparent dome mounted on said stable platform to enclose said active optical system.

7. A gimballed active optical sytem as recited in claim 6 wherein said illumination source comprises a laser.

8. A gimballed active optical system as recited in claim 7 wherein said primary mirror comprises a concave mirror, and said optical detector comprises a quadrature photodiode.

9. A gimballed active optical system as recited in claim 8 further comprising an optical shield around the path of said beam to prevent stray optical radiation.

10. A gimballed active optical system as recited in claim 9 further comprising collimator optics located in the path of said beam to control the divergence of said beam from said output prism.

11. A gimballed active optical system as recited in claim 1 wherein said primary mirror is mounted on said gimbal system.

* * * * *